(12) United States Patent
Sasaki et al.

(10) Patent No.: US 9,897,037 B2
(45) Date of Patent: Feb. 20, 2018

(54) FUEL CONTROL SYSTEM OF ENGINE

(71) Applicant: Mazda Motor Corporation, Aki-gun, Hiroshima (JP)

(72) Inventors: Junsou Sasaki, Hiroshima (JP); Naohiro Yamaguchi, Hiroshima (JP); Yusuke Oda, Hiroshima (JP); Yoshitaka Wada, Hiroshima (JP); Yuya Honda, Higashihiroshima (JP)

(73) Assignee: Mazda Motor Corporation, Aki-gun, Hiroshima (JP)

(*) Notice: Subject to any disclaimer, the term of this patent is extended or adjusted under 35 U.S.C. 154(b) by 9 days.

(21) Appl. No.: 15/055,196

(22) Filed: Feb. 26, 2016

(65) Prior Publication Data

US 2016/0281663 A1  Sep. 29, 2016

(30) Foreign Application Priority Data

Mar. 27, 2015 (JP) ................................ 2015-066810

(51) Int. Cl.
| | |
|---|---|
| *F02B 23/10* | (2006.01) |
| *F02D 41/00* | (2006.01) |
| *F02F 3/24* | (2006.01) |
| *F02D 41/40* | (2006.01) |

(52) U.S. Cl.
CPC .............. *F02F 3/24* (2013.01); *F02B 23/104* (2013.01); *F02D 41/402* (2013.01);
(Continued)

(58) Field of Classification Search
CPC ................ F02B 67/10; F02B 2023/106; F02B 2023/107; F02B 2023/103; F02B 2275/14;
(Continued)

(56) References Cited

U.S. PATENT DOCUMENTS

| | | | | |
|---|---|---|---|---|
| 6,557,532 B1* | 5/2003 | Nakayama | ............ | F02B 17/005 123/299 |
| 2003/0066508 A1* | 4/2003 | Nakayama | ............ | F02B 23/101 123/295 |

(Continued)

FOREIGN PATENT DOCUMENTS

| | | |
|---|---|---|
| JP | 2006266119 A | 10/2006 |
| JP | 4924751 B1 | 4/2012 |
| JP | 2012225247 A | 11/2012 |

*Primary Examiner* — Lindsay Low
*Assistant Examiner* — George Jin
(74) *Attorney, Agent, or Firm* — Alleman Hall Creasman & Tuttle LLP

(57) ABSTRACT

A fuel control system of an engine is provided which controls, by using a tumble flow, a behavior of fuel directly injected into a combustion chamber formed inside a cylinder of the engine. The fuel control system includes a fuel injector for directly injecting the fuel into the combustion chamber, a tumble flow generator for generating the tumble flow within the combustion chamber, and a fuel injector controlling module for causing the fuel injector to inject the fuel at a first injection timing and then inject a smaller amount of fuel than an amount injected at the first injection timing, in a direction opposing a positive direction of the tumble flow at a second injection timing, the first injection timing designed to be in an intake stroke of the cylinder, the second injection timing designed to be in a latter half of the compression stroke of the cylinder.

11 Claims, 9 Drawing Sheets

(52) U.S. Cl.
CPC ... *F02B 2023/106* (2013.01); *F02B 2023/107* (2013.01); *F02B 2275/14* (2013.01); *F02D 2041/0015* (2013.01); *Y02T 10/123* (2013.01); *Y02T 10/125* (2013.01)

(58) Field of Classification Search
CPC ... F02B 2275/48; F02B 23/104; F02M 45/02; F02M 45/04; F02F 3/24; F02D 41/3052; F02D 41/005; F02D 41/0002; F02D 41/401; F02D 41/402; F02D 41/403; F02D 41/1498; F02D 2041/0015
See application file for complete search history.

(56) References Cited

U.S. PATENT DOCUMENTS

| | | | |
|---|---|---|---|
| 2003/0074890 A1* | 4/2003 | Yamashita | F02D 41/024 60/284 |
| 2005/0161021 A1* | 7/2005 | Ishii | F02D 37/02 123/305 |
| 2006/0243243 A1* | 11/2006 | Fukasawa | F02D 41/1498 123/299 |
| 2006/0260584 A1* | 11/2006 | Ballauf | F02B 17/005 123/263 |
| 2012/0111302 A1 | 5/2012 | Shishime et al. | |
| 2015/0057911 A1 | 2/2015 | Wooldridge et al. | |
| 2016/0115880 A1* | 4/2016 | Kondo | F02P 5/15 123/406.55 |
| 2016/0131091 A1* | 5/2016 | Kaneko | F01N 3/22 60/285 |
| 2016/0273475 A1* | 9/2016 | Dodate | F02D 41/3094 |
| 2016/0356229 A1* | 12/2016 | Watanabe | F02D 41/064 |
| 2016/0356230 A1* | 12/2016 | Watanabe | F02D 41/064 |
| 2016/0363106 A1* | 12/2016 | Mori | F02D 41/024 |

* cited by examiner

FUEL CONTROL SYSTEM OF ENGINE

BACKGROUND

The present invention relates to a fuel control system of an engine, particularly to a fuel control system of an engine which controls, by using a tumble flow, a behavior of fuel directly injected into a combustion chamber formed inside a cylinder of the engine.

When an operating state of an engine is within an operating range where an engine load is high and an engine speed is low, abnormal combustion, such as knocking and pre-ignition, easily occurs due to an inhomogeneous mixture gas and a slow flame propagation after spark ignition inside a combustion chamber of the engine. To suppress such abnormal combustion (e.g., knocking), it is known to significantly retard an ignition timing to after a top dead center of a compression stroke (CTDC). However, when the ignition timing is retarded to after the CTDC, combustion pressure inside the combustion chamber reduces, and thus, an output torque of the engine also reduces.

Therefore, an art of splitting a fuel injection into the combustion chamber into a plurality of injections to secure a high torque while suppressing knocking is proposed. For example, with a control method of an engine disclosed in JP4924751B, when an operating state of the engine is within a first engine speed range where the engine speed is relatively low, a retarding amount of an ignition timing is designed to be larger than that within a second engine speed range where the engine speed is higher than the first engine speed range, a fuel injection mode is designed to be a split injection mode in which the fuel is injected at least twice, and a timing of the final injection thereof is designed to be in an early half of the compression stroke. The fuel injected into the combustion chamber in the early half of the compression stroke reduces a temperature of mixture gas inside the combustion chamber by latent heat of vaporization. Thus, knocking can be suppressed and, accordingly, the ignition timing can be advanced to increase the torque.

Meanwhile, it is known that by increasing a flame propagation speed after spark ignition, a mixture gas can be combusted normally before knocking occurs, and thus, knock resistance improves.

However, with the control method of the engine in JP4924751B described above, the ignition is performed in a state where the fuel injected into the combustion chamber in the early half of the compression stroke is spread substantially uniformly inside the combustion chamber during the compression stroke. Therefore, compared to the case where the split injections of the fuel are not performed, there is no change in an air-fuel ratio of mixture gas near an ignition plug, and there is no significant difference in the flame propagation speed.

Therefore, in the conventional control method of the engine described above, there is a scope for improving the knock resistance even more by increasing the flame propagation speed, and advancing the ignition timing to increase the torque.

SUMMARY

The present invention is made in view of solving the problems of the conventional art described above, and aims to provide a fuel control system of an engine which is capable of achieving a high torque while suppressing knocking even within an engine operating range where abnormal combustion, such as knocking, easily occurs.

According to one aspect of the present invention, a fuel control system of an engine is provided. The fuel control system controls, by using a tumble flow, a behavior of fuel directly injected into a combustion chamber formed inside a cylinder of the engine. The fuel control system includes a fuel injector for directly injecting the fuel into the combustion chamber, a tumble flow generator for generating the tumble flow within the combustion chamber, and a fuel injector controlling module for causing the fuel injector to inject the fuel at a first injection timing and then inject a smaller amount of fuel than an amount injected at the first injection timing, in a direction opposing a positive direction of the tumble flow in the combustion chamber at a second injection timing, the first injection timing is designed to be in an intake stroke of the cylinder, and the second injection timing is designed to be in a latter half of a compression stroke of the cylinder.

With this configuration, the fuel injector controlling module causes the fuel injector to inject the fuel at the first injection timing, and then inject the smaller amount of fuel than the amount injected at the first injection timing, in the direction opposing the positive direction of the tumble flow at the second injection timing. Therefore, in the fuel injection at the second injection timing, a kinetic energy of the fuel injected by the fuel injector is canceled by a kinetic energy of the tumble flow which opposes the injection direction of the fuel and, thus, the fuel does not penetrate the tumble flow and an area where the fuel is rich can be formed within a lower section of the tumble flow. Further, by shifting the rich area along the tumble flow to be located near a tip of an ignition plug at an ignition timing, ignitability by the ignition plug can be improved, and since a flame propagation speed increases, knock resistance can be improved. Moreover, by injecting, at the first injection timing, the larger amount of fuel than the amount injected at the second fuel injection timing, vaporization of the fuel is stimulated to cool mixture gas with latent heat of the vaporization, and the knock resistance can further be improved. Therefore, also within an operating range where abnormal combustion, such as knocking, easily occurs, knocking can securely be suppressed, and accordingly, the ignition timing can be advanced to increase torque. Furthermore, by injecting the larger amount of fuel at the first injection timing, the fuel can be uniformly distributed within the combustion chamber to achieve homogeneous combustion, and thus, emission performance can also be improved.

The second injection timing is preferably designed to be between 50° and 90° before a top dead center of the compression stroke.

With this configuration, the fuel can securely be injected at a timing at which the injection direction of the fuel opposes the tumble flow, and thus, the fuel rich area can be formed within the tumble flow, and the rich area can be shifted along the tumble flow to securely be located near the tip of the ignition plug at the ignition timing, and the flame propagation speed can securely be increased.

The fuel injector controlling module preferably causes the fuel injector to inject 10% to 20% of a total fuel injection amount in one operation cycle of the cylinder at the second injection timing.

With this configuration, when the rich area formed within the tumble flow is shifted to near the tip of the ignition plug at the ignition timing, the mixture gas near the tip of the ignition plug can suitably be enriched and the flame propagation speed can securely be increased, and further, the mixture gas within an area far from the ignition plug can be prevented from becoming excessively lean, and unstable combustion can be prevented from occurring.

The tumble flow generator is preferably an intake port of the engine. An ignition plug of the engine is preferably provided in a center portion of a ceiling of the combustion chamber. The fuel injector is preferably disposed at a position of a circumferential edge portion of the ceiling of the combustion chamber on a side where the intake port is provided, and preferably injects the fuel obliquely downward and toward an opposite side from the intake port. The engine preferably has a piston having a crown face, and the crown face is preferably formed with an inclined surface extending along an extending direction obliquely upward and toward the side where the fuel injector is provided, from an end portion of the crown face on an opposite side from the fuel injector. The second injection timing is preferably designed to be a timing at which an injection direction of the fuel by the fuel injector opposes the extending direction of the inclined surface of the crown face.

With this configuration, the fuel injector controlling module causes the fuel injector to inject the fuel at the second injection timing designed to be the timing at which the injection direction of the fuel by the fuel injector opposes the extending direction of the inclined surface of the crown face. Therefore, the fuel can be injected in the direction opposing the positive direction of the lower section of the tumble flow which is obliquely upward and toward the fuel injector along the inclined surface of the crown face. Thus, the fuel rich area can be formed within the tumble flow, the rich area can be shifted along the tumble flow to securely be located near the tip of the ignition plug at the ignition timing, and the flame propagation speed can securely be increased.

The injection direction of the fuel by the fuel injector is preferably parallel to the extending direction of the inclined surface of the crown face.

With this configuration, the injection direction of the fuel can securely oppose the positive direction of the tumble flow which is obliquely upward and toward the fuel injector along the inclined surface of the crown face. Thus, the fuel rich area can be formed within the tumble flow, the rich area can be shifted along the tumble flow to more securely be located near the tip of the ignition plug at the ignition timing, and the flame propagation speed can securely be increased.

The fuel injector controlling module preferably causes the fuel injector to inject the fuel at the second injection timing when an operating state of the engine in a warmed-up state is within an operating range of the engine where an engine load is relatively high and an engine speed is relatively low, and the fuel injector controlling module preferably does not cause the fuel injector to inject the fuel at the second injection timing when the operating state of the engine in the warmed-up state is outside the operating range where the engine load is relatively high and the engine speed is relatively low or when the engine is in a cold state.

With this configuration, when the operating state of the engine in the warmed-up state is within the operating range where the engine load is relatively high and the engine speed is relatively low, in which knocking easily occurs, the fuel is injected at the second injection timing to form the rich area near the ignition plug at the ignition timing, so as to increase the flame propagation speed and improve the knock resistance. On the other hand, when the operating state of the engine is outside the operating range where the engine load is relatively high and the engine speed is relatively low or in the cold state, in which knocking does not easily occur, by injecting the entirety of the fuel in a single injection at the first injection timing to stimulate the vaporization of the fuel and uniformly distribute the fuel within the combustion chamber, the emission performance can be improved.

BRIEF DESCRIPTION OF THE DRAWINGS

FIGS. 3A and 3B are views illustrating a piston of the engine according to the embodiment of the present invention, in which FIG. 3A is a plan view of the piston and FIG. 3B is a view taken along a line A-A in FIG. 3A.

DETAILED DESCRIPTION OF EMBODIMENT

Hereinafter, a fuel control system of an engine according to one embodiment of the present invention is described with reference to the accompanying drawings.

[System Configuration]

Figure 1:
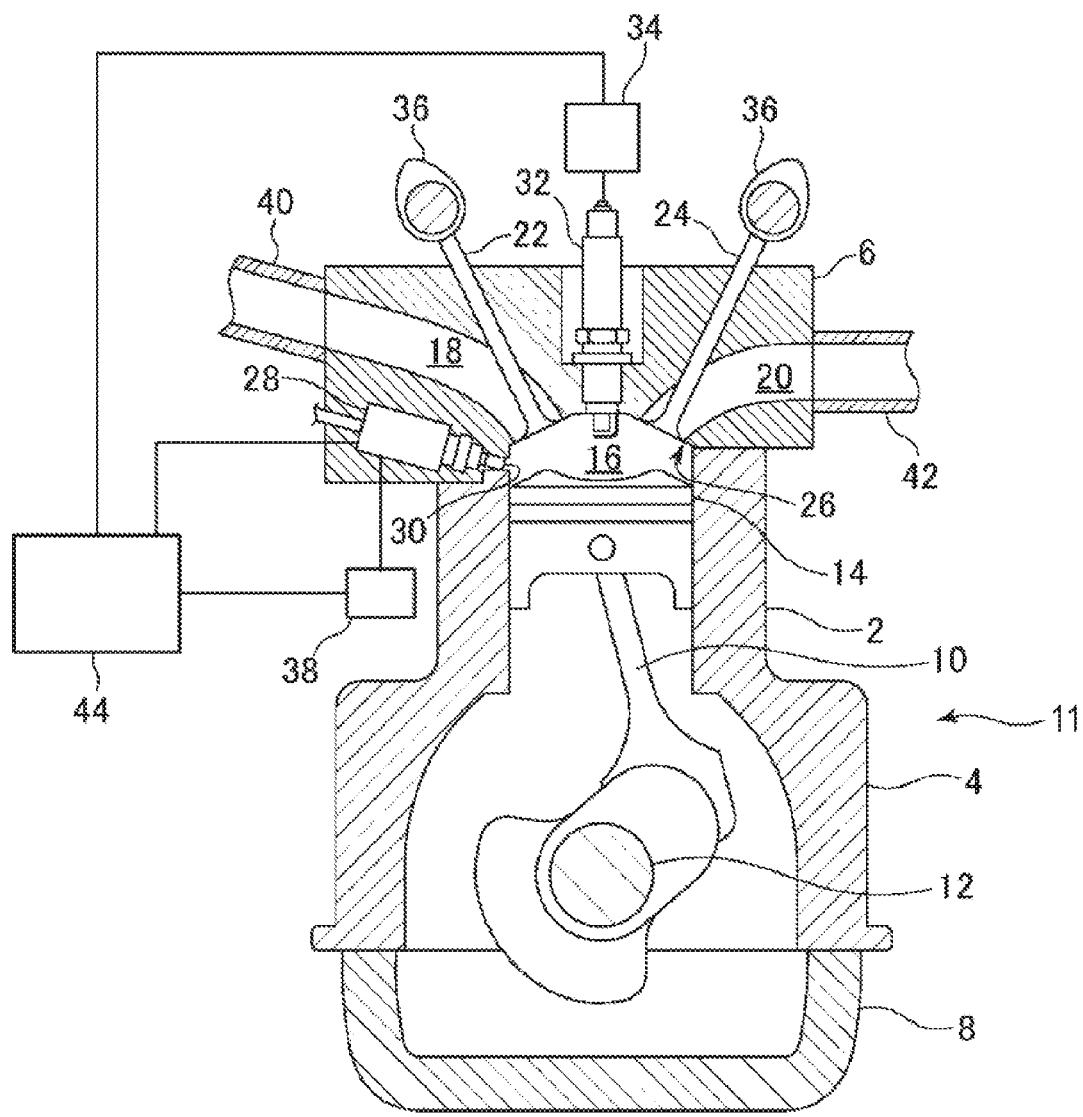
FIG. 1 is a view schematically illustrating a configuration of an engine to which a fuel control system according to one embodiment of the present invention is applied.

First, a configuration of an engine to which a fuel control system according to one embodiment of the present invention is applied is described with reference to FIG. 1. FIG. 1 is a view schematically illustrating the configuration of the engine to which the fuel control system according to the embodiment of the present invention is applied.

In FIG. 1, the reference character "1" indicates the engine to which the fuel control system according to this embodiment of the present invention is applied. The engine 1 is a gasoline engine that is mounted on a vehicle and supplied with fuel containing at least gasoline. The engine 1 includes a cylinder block 4 provided with a plurality of cylinders 2 (note that, although only one cylinder 2 is illustrated in FIG. 1, for example, four cylinders are linearly disposed), a cylinder head 6 disposed on the cylinder block 4, and an oil pan 8 disposed below the cylinder block 4 and storing a lubricant. A reciprocatable piston 14 coupled to a crankshaft 12 via a connecting rod 10 is fitted into each of the cylinders 2. The cylinder head 6, the cylinders 2, and the pistons 14 define combustion chambers 16. In the cylinder head 6, two independent intake ports 18 and two independent exhaust ports 20 are formed for each of the cylinders 2, each of the intake ports 18 is provided with an intake valve 22 for opening and closing the intake port 18 on the combustion chamber 16 side and each of the exhaust ports 20 is provided with an exhaust valve 24 for opening and closing the exhaust port 20 on the combustion chamber 16 side. The intake port 18 functions as a tumble flow generator for generating a vortex flow in up-and-down directions of the piston (tumble flow) within the combustion chamber 16.

Further, a bottom face of the cylinder head 6 forms ceilings 26 of the respective combustion chambers 16. Each of the ceilings 26 has a so-called pent-roof shape having two opposing inclined faces extending from a center of the ceiling 26 to a bottom end of the cylinder head 6.

Further, a (direct) injector 28 for directly injecting the fuel into the cylinder 2 is attached to the cylinder head 6 for each cylinder 2. Each injector 28 is arranged so that its plurality of nozzle holes 30 are oriented obliquely downward and toward an inside of the combustion chamber 16, at a position of a circumferential edge portion of the ceiling 26 of the combustion chamber 16, between the two intake ports 18. The injector 28 directly injects into the combustion chamber 16 an amount of fuel corresponding to an operating state of the engine 1 at an injection timing designed according to the operating state of the engine 1. A specific configuration of the injector 28 is described later.

Moreover, an ignition plug 32 for forcibly igniting mixture gas inside the combustion chamber 16 is attached to the cylinder head 6 for each cylinder 2. Each ignition plug 32 is arranged penetrating the cylinder head 6 so as to extend downward from a center portion of the ceiling 26 of the combustion chamber 16. The ignition plug 32 is connected with an ignition circuit 34 for supplying a voltage to the ignition plug 32.

The cylinder head 6 is further provided with valve driving mechanisms 36 for driving the intake and exhaust valves 22 and 24 of each cylinder 2, respectively. The valve driving mechanisms 36 include, for example, a non-illustrated variable valve lift mechanism (VVL (Variable Valve Lift)) for changing lifts of the intake and exhaust valves 22 and 24, and a non-illustrated valve phase variable mechanism (VVT (Variable Valve Timing)) for changing a rotational phase of a camshaft with respect to the crankshaft 12.

A fuel supply path couples a fuel tank (not illustrated) with the injectors 28. A fuel supply system 38 for supplying the fuel to each of the injectors 28 at a desirable fuel pressure is provided within the fuel supply path. The pressure of the fuel supplied to each injector 28 is changed according to the operating state of the engine 1.

On one side surface of the engine 1, as illustrated in FIG. 1, an intake passage 40 is connected to communicate with the intake ports 18 of the respective cylinders 2. On the other side surface of the engine 1, an exhaust passage 42 is connected to guide out burned gas (exhaust gas) discharged from the combustion chambers 16 of the respective cylinders 2.

The engine 1 is controlled by a powertrain control module (hereinafter, referred to as the PCM) 44. The PCM 44 is comprised of a microprocessor including a CPU, a memory, a counter timer group, an interface, and paths for connecting these units. The PCM 44 constitutes a controller.

The PCM 44 receives detection signals from various kinds of sensors. Specifically, the PCM 44 receives detection signals from a fluid temperature sensor for detecting a temperature of an engine coolant, a crank angle sensor for detecting a rotational angle of the crankshaft 12, an accelerator position sensor for detecting an accelerator opening degree corresponding to an angle (operation amount) of an acceleration pedal of the vehicle, etc. Note that these sensors are not illustrated.

By performing various kinds of operations based on these detection signals, the PCM 44 determines the operating state of the engine 1, and further, the vehicle, and outputs control signals to the injectors 28, the ignition circuit 34, the valve driving mechanisms 36, the fuel supply system 38, etc., according to the determined state. In this manner, the PCM 44 operates the engine 1. Although described in detail later, the PCM 44 may be referred to as the fuel control system of the engine 1, and functions as a fuel injection valve controlling module.

[Specific Structures of Pistons, Injectors and Ignition Plugs]

Figure 2:
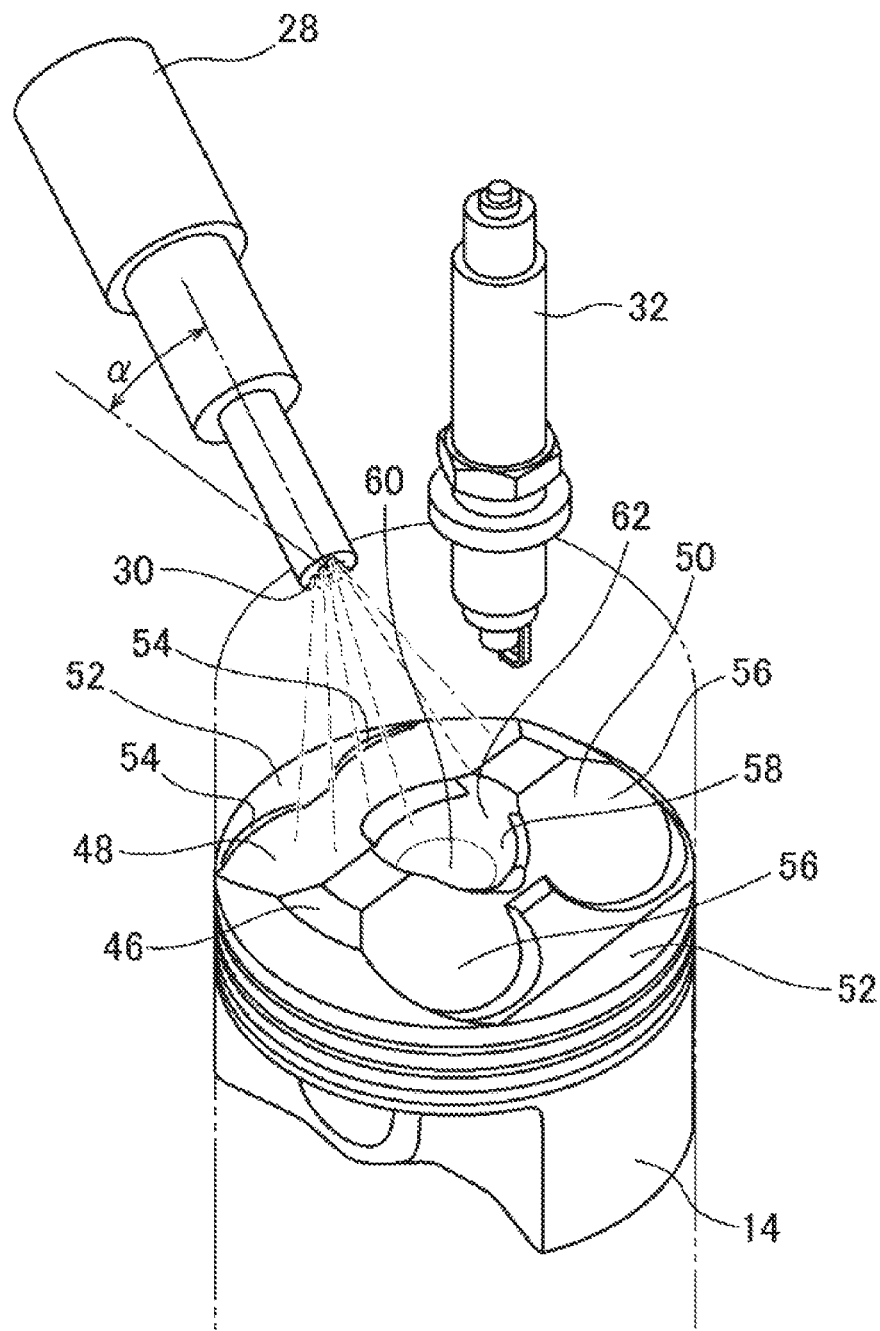
FIG. 2 is a perspective view illustrating specific structures of an injector and an ignition plug of the engine according to the embodiment of the present invention.
Figure 3A:
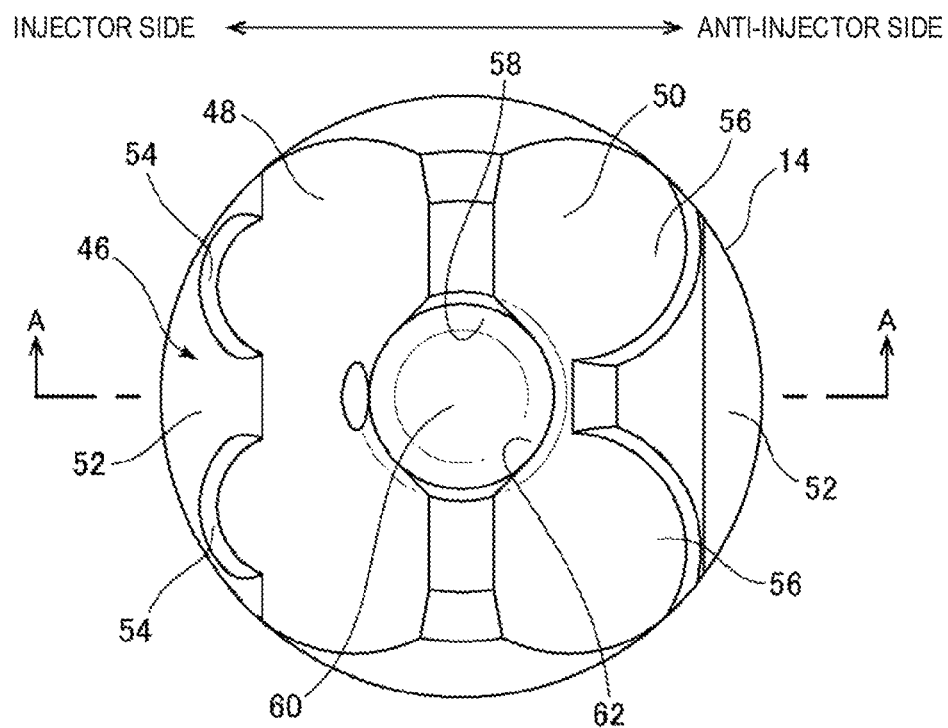
Figure 3B:
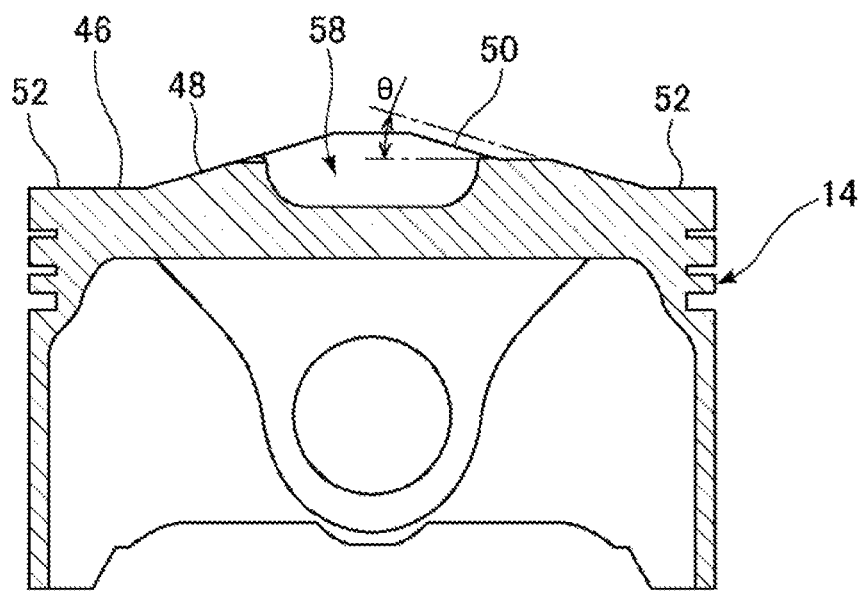

Next, specific structures of each piston 14, each injector 28, and each ignition plug 32 of the engine 1 of this embodiment are described with reference to FIGS. 2, 3A and 3B. FIG. 2 is a perspective view illustrating the specific structures of the injector 28 and the ignition plug 32 of the engine 1 according to the embodiment of the present invention. FIGS. 3A and 3B are views illustrating the piston 14 of the engine 1 according to the embodiment of the present invention, in which FIG. 3A is a plan view of the piston 14 and FIG. 3B is a view taken along a line A-A in FIG. 3A.

As illustrated in FIG. 2, the injector 28 is a multi-hole injector having the plurality of nozzle holes 30. The injector 28 is provided so that its axial direction inclines downward by an inclined angle $\alpha$ from a horizontal direction. Thus, fuel spray injected from each nozzle hole 30 of the injector 28 radially spreads obliquely downward from the circumferential edge portion of the ceiling 26 of the combustion chamber 16.

As illustrated in FIGS. 2, 3A and 3B, a crown face 46 forming a top portion of the piston 14 is formed to bulge toward its center. Specifically, the crown face 46 has an injector-side inclined surface 48 extending along an extending direction obliquely upward from an end portion of the crown face 46 on the injector 28 side toward the center of the crown face 46, and an anti-injector-side inclined surface 50 extending along an extending direction obliquely upward from an end portion of the crown face 46 on an opposite side from the injector 28 side (hereinafter, may be referred to as the "anti-injector-side") toward the center of the crown face 46. The injector-side inclined surface 48 and the anti-injector-side inclined surface 50 are formed along the shape of the ceiling 26 of the combustion chamber 16.

Particularly, an inclined angle $\theta$ of the anti-injector-side inclined surface 50 is designed so that the axial direction of the injector 28 (i.e., an injection direction of the fuel by the injector 28) is substantially parallel to a direction in which the anti-injector-side inclined surface 50 extends obliquely upward from the end portion of the crown face 46 on the anti-injector-side toward the center (i.e., a direction extending obliquely upward and toward the injector 28). Specifically, the inclined angle $\alpha$ of the injector 28 is substantially the same as the inclined angle $\theta$ of the anti-injector-side inclined surface 50.

The end portion of the crown face 46 on the injector 28 side and the end portion on the anti-injector side are formed with horizontal surfaces 52, respectively, as a reference surface of the crown face 46.

Intake valve recesses 54 are formed in the horizontal surface 52 on the injector 28 side to avoid contact between the piston 14 and the intake valves 22, and exhaust valve recesses 56 are formed in the anti-injector-side inclined surface 50 to avoid contact between the piston 14 and the exhaust valves 24.

A cavity 58 dented substantially circularly in a plan view is formed at the center of the crown face 46. The cavity 58 is formed by a horizontal bottom face 60 having a substantially circular shape in a plan view, and a side surface 62 inclining radially upward from an outer circumference of the bottom face 60. When the piston 14 is at a top dead center, a tip of the ignition plug 32 is located within the cavity 58, and thus, a substantially ball-shaped combustion space centering on the tip of the ignition plug 32 is formed.

[Fuel Injection Timing]

Figure 4:
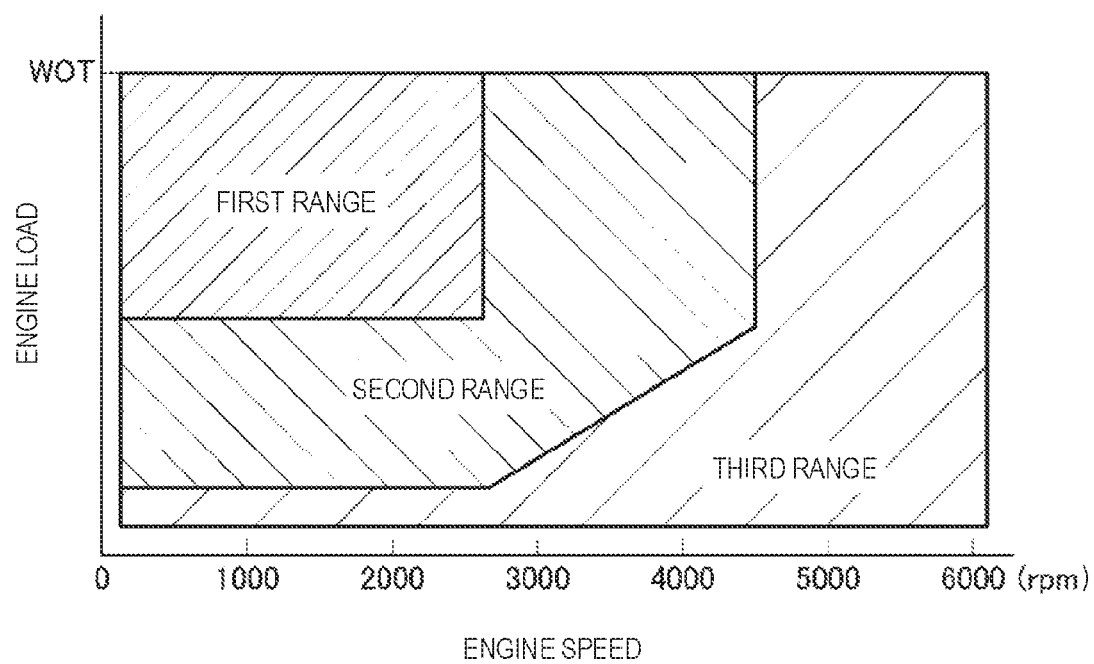
FIG. 4 is a chart illustrating operating ranges of the engine according to the embodiment of the present invention.
Figure 5:
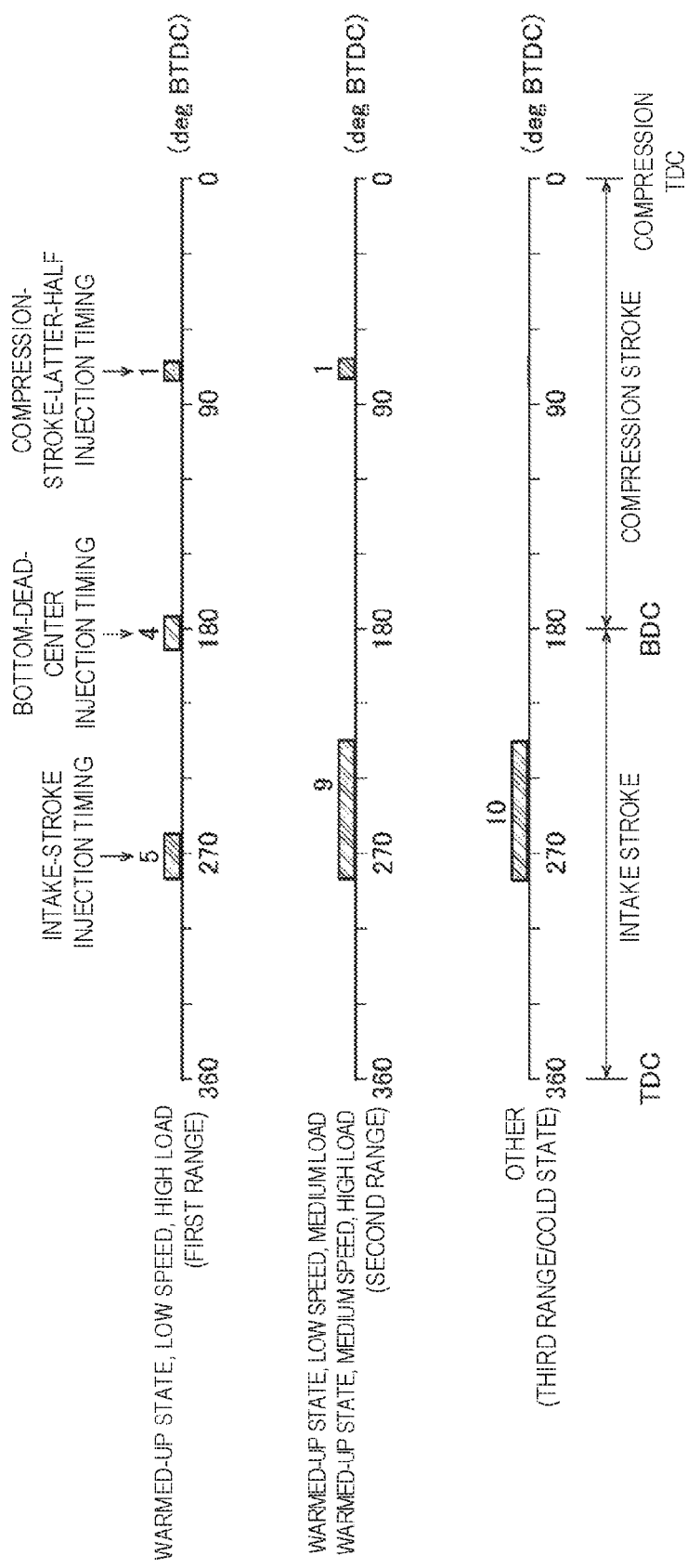
FIG. 5 illustrates time charts of fuel injection timings controlled by the fuel control system of the engine according to the embodiment of the present invention.
Figure 6:
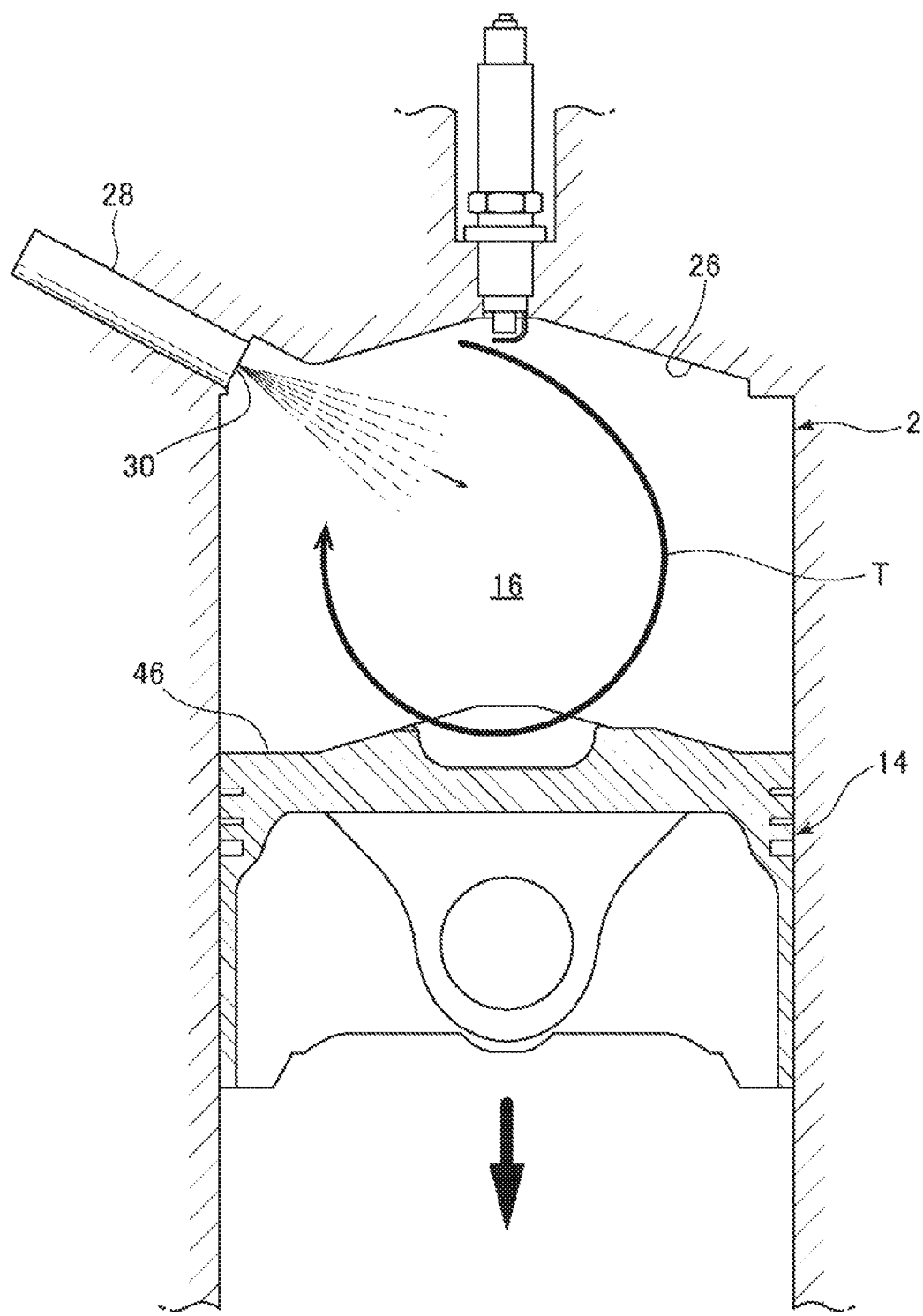
FIG. 6 is a cross-sectional view illustrating a state inside a combustion chamber when the fuel is injected in an intake stroke by the fuel control system according to the embodiment of the present invention.
Figure 7:
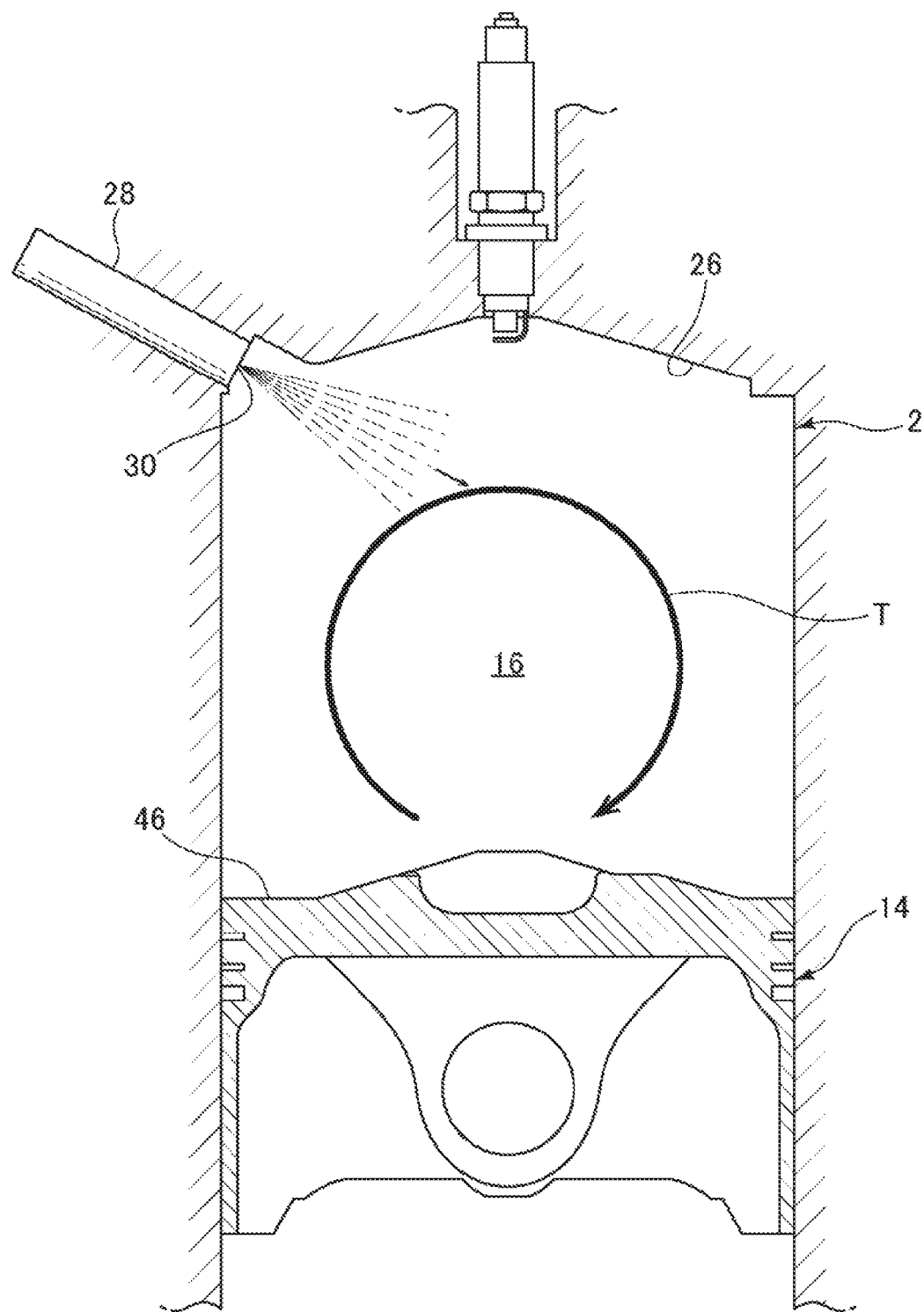
FIG. 7 is a cross-sectional view illustrating a state inside the combustion chamber when the fuel is injected around a bottom dead center by the fuel control system according to the embodiment of the present invention.
Figure 8:
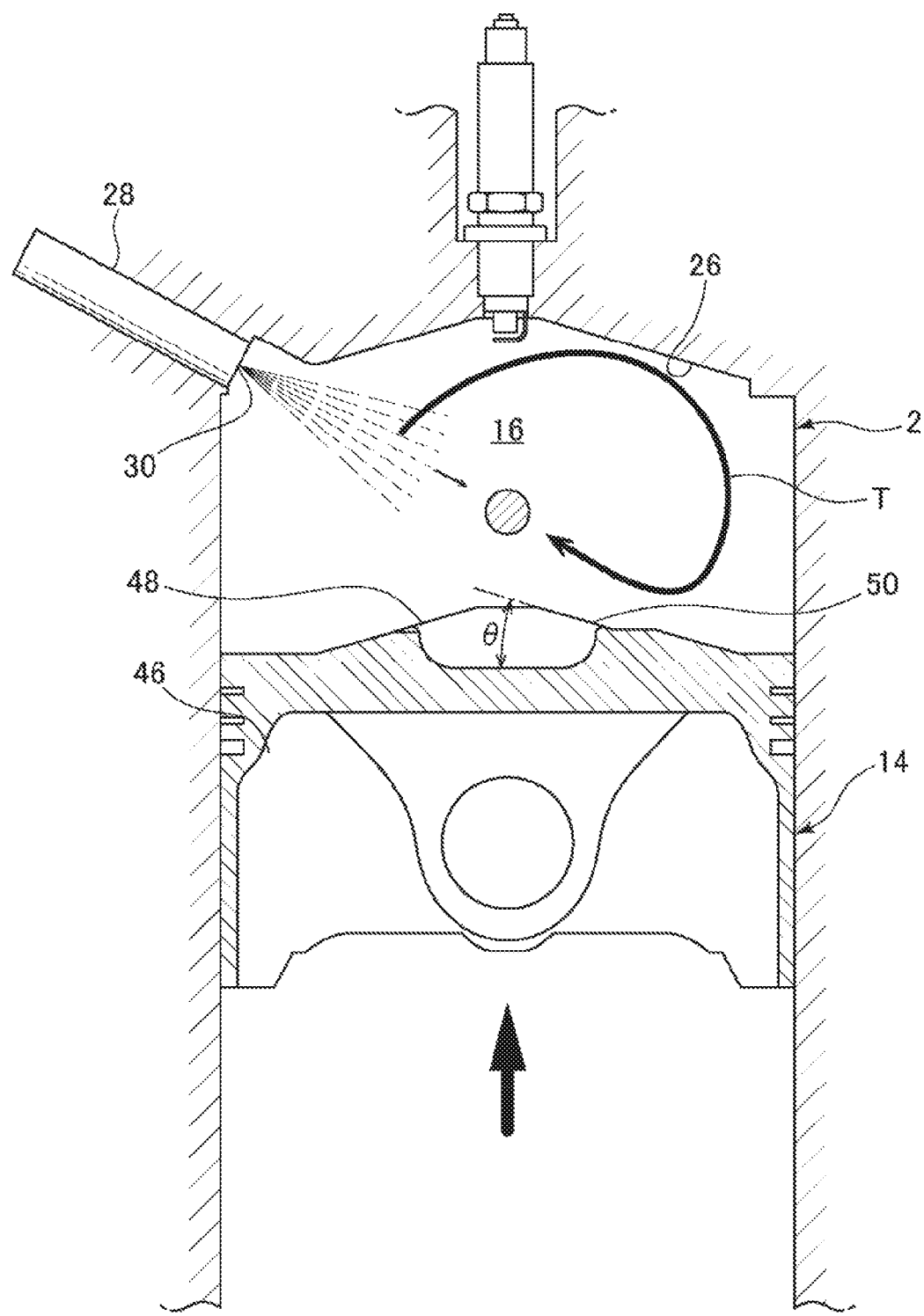
FIG. 8 is a cross-sectional view illustrating a state inside the combustion chamber when the fuel is injected in a latter half of a compression stroke by the fuel control system according to the embodiment of the present invention.
Figure 9:
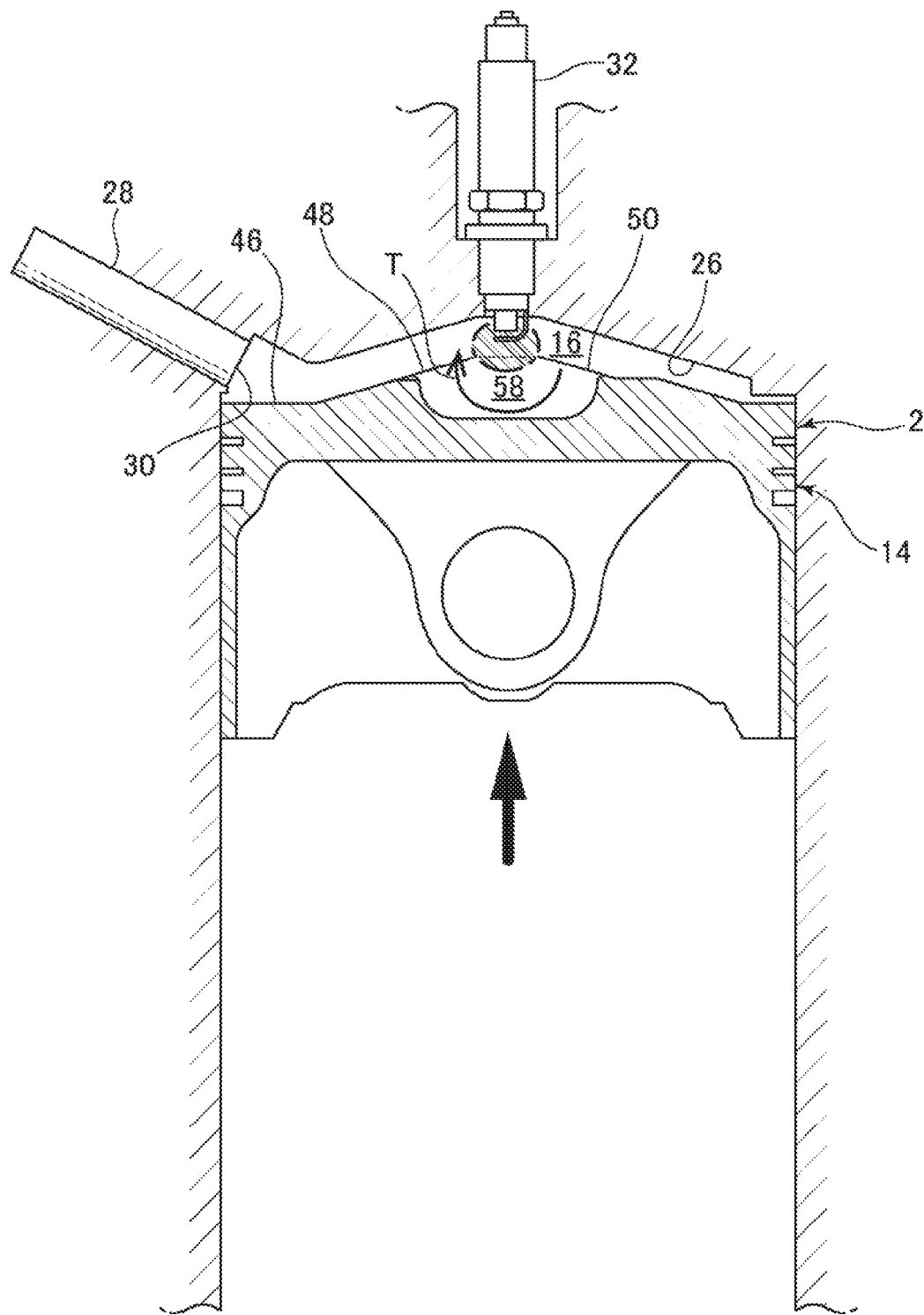
FIG. 9 is a cross-sectional view illustrating a state inside the combustion chamber at an ignition timing controlled by the fuel control system according to the embodiment of the present invention.

Next, a control of the fuel injection timing by the fuel control system of the engine 1 of this embodiment is described with reference to FIGS. 4 to 9. FIG. 4 is a chart illustrating operating ranges of the engine 1 according to the embodiment of the present invention, in which the horizontal axis indicates an engine speed and the vertical axis indicates an engine load. FIG. 5 illustrates time charts of fuel injection timings controlled by the fuel control system of the engine 1 according to the embodiment of the present invention, in which the horizontal axis indicates a crank angle before a CTDC (deg BTDC), and the numbers on the bars that indicate the fuel injection timings indicate fuel injection amounts at the respective fuel injection timings when the total fuel injection amount in one cycle (operation cycle of the cylinder) is 10. FIG. 6 is a cross-sectional view illustrating a state inside the combustion chamber 16 when the fuel is injected in an intake stroke by the fuel control system according to the embodiment of the present invention. FIG. 7 is a cross-sectional view illustrating a state inside the combustion chamber 16 when the fuel is injected around a bottom dead center by the fuel control system according to the embodiment of the present invention. FIG. 8 is a cross-sectional view illustrating a state inside the combustion chamber 16 when the fuel is injected in a latter half of a compression stroke by the fuel control system according to the embodiment of the present invention. FIG. 9 is a cross-sectional view illustrating a state inside the combustion chamber 16 at an ignition timing controlled by the fuel control system according to the embodiment of the present invention.

First, as illustrated in FIG. 4, within an operating range where the engine load is relatively high and the engine speed is relatively low in a warmed-up state of the engine (a first range in FIG. 4), based on the detection signals received from the fluid temperature sensor, the crank angle sensor, the accelerator position sensor, etc., the PCM 44 performs the fuel injection in each cycle by splitting the injection into three injections, so as to suppress knocking and improve output torque.

Within an operating range where the engine load is lower and the engine speed is higher than the first range in the engine warmed-up state (in the engine warmed-up state, an operating range where the engine load is relatively medium and the engine speed is relatively low and an operating range where the engine load is relatively high and the engine speed is relatively medium, i.e., a second range in FIG. 4), the PCM 44 performs the fuel injection in each cycle by splitting the injection into two injections, so as to suppress knocking and improve the output torque.

Within an operating range where the engine load is lower and the engine speed is higher than the second range in the engine warmed-up state (in the engine warmed-up state, an operating range where the engine load is relatively low and an operating range where the engine load is relatively high and the engine speed is relatively high, i.e., a third range in FIG. 4), the PCM 44 injects the entirety of the fuel in a single injection in each cycle. Further, the PCM 44 injects the entirety of the fuel in a single injection in each cycle also in a cold state of the engine. Thus, the PCM 44 switches the number of fuel injections in one cycle, according to the operating state of the engine 1. Note that the boundaries for switching the number of fuel injections are not limited to the illustrated example.

Specifically, as illustrated in FIG. 5, when the operating state of the engine 1 is within the first range of FIG. 4, the PCM 44 causes the injector 28 to inject the fuel by splitting the injection into three injections at a timing on the intake stroke of the cylinder 2, specifically, an intake-stroke injection timing designed to be around 270 [deg BTDC] (first injection timing), a bottom-dead-center injection timing designed to be around the bottom dead center (180 [deg BTDC]), and a timing in the latter half of the compression stroke of the cylinder 2, specifically, a compression-stroke-latter-half injection timing designed to be between 50 and 90 [deg BTDC] (second injection timing). When a total fuel injection amount in one cycle is 10, a ratio of the fuel injection amounts at the respective injection timings is 5:4:1 (intake-stroke injection timing:bottom-dead-center injection timing:compression-stroke-latter-half injection timing). Thus, the PCM 44 causes the injector 28 to inject 10% of the total fuel injection amount at the compression-stroke-latter-half injection timing. Note that the total fuel injection amount in one cycle is designed so that the mixture gas becomes lean as a whole, which is leaner than a theoretical air-fuel ratio.

When the operating state of the engine 1 is within the second range of FIG. 4, the PCM 44 causes the injector 28 to inject the fuel by splitting the injection into two injections at a timing on the intake stroke of the cylinder 2, specifically, the intake-stroke injection timing, and a timing in the latter half of the compression stroke of the cylinder 2, specifically, the compression-stroke-latter-half injection timing. When the total fuel injection amount in one cycle is 10, a ratio of the fuel injection amounts at the respective injection timings is 9:1 (intake-stroke injection timing:compression-stroke-latter-half injection timing). Thus, the PCM 44 causes the injector 28 to inject 10% of the total fuel injection amount at the compression-stroke-latter-half injection timing.

When the operating state of the engine 1 is within the third range of FIG. 4 or is in the cold state, the PCM 44 causes the injector 28 to inject the entirety of the fuel in a single injection on the intake stroke of the cylinder 2, specifically, at the intake-stroke injection timing.

First, at the intake-stroke injection timing, as illustrated in FIG. 6, a tumble flow T (the vortex flow in the up-and-down directions of the piston) is generated by intake air flowing into the combustion chamber 16 from the intake ports 18 due to the intake valves 22 being opened and the piston 14 descending. When the PCM 44 controls the injector 28 and the fuel supply system 38 to inject the fuel from the injector 28 at the intake-stroke injection timing, the fuel injected by the injector 28 flows within the combustion chamber 16 along the tumble flow T. Especially around 270 [deg BTDC] corresponding to the intake-stroke injection timing, the descending speed of the piston 14 reaches its peak and the gas flow within the combustion chamber 16 is most active. Therefore, vaporization of the fuel injected into the combustion chamber 16 can be stimulated. Further, since a time length from the intake-stroke injection timing to the ignition timing is long, sufficient time can be secured to vaporize the fuel injected at the intake-stroke injection timing and the fuel can uniformly be distributed within the combustion chamber 16.

Next, at the bottom-dead-center injection timing, as illustrated in FIG. 7, the tumble flow T generated on the intake stroke is extended in the up-and-down directions of the piston 14 as the piston 14 descends. When the PCM 44 controls the injector 28 and the fuel supply system 38 to inject the fuel from the injector 28 at this timing, the fuel is injected toward an area near an upper end of the tumble flow T. Near the upper end of the tumble flow T, a positive direction of the tumble flow T is a direction toward the exhaust ports 20 from the intake ports 18, i.e., away from the injector 28. Therefore, the fuel is injected by the injector 28 in the same direction as the positive direction of the flow near the upper end of the tumble flow T. Thus, the tumble flow T is strengthened by the fuel injection. As a result, the turbulence of the flow of the mixture gas within the combustion chamber 16 can be maintained until the ignition timing, resulting in improving the flame propagation speed and obtaining homogeneous combustion.

Then, at the compression-stroke-latter-half injection timing, as illustrated in FIG. 8, the tumble flow T generated on the intake stroke is compressed in the up-and-down directions as the piston 14 elevates. A positive direction of a lower section of the tumble flow T is oriented obliquely upward and toward the injector 28 along the anti-injector-side inclined surface 50 of the crown face 46. Particularly between 50 and 90 [deg BTDC] corresponding to the compression-stroke-latter-half injection timing, a lower end portion of the fuel spray injected obliquely downward to spread radially from the injector 28 is in an extended line of the anti-injector-side inclined surface 50 of the crown face 46, and the injection direction of the fuel by the injector 28 substantially opposes the direction in which the anti-injector-side inclined surface 50 of the crown face 46 extends obliquely upward and toward the injector 28. Therefore, when the PCM 44 controls the injector 28 and the fuel supply system 38 to inject the fuel from the injector 28 at the compression-stroke-latter-half injection timing, the fuel is injected in the direction opposing the positive direction of the lower section of the tumble flow T which is obliquely upward and toward the injector 28 along the anti-injector-side inclined surface 50 of the crown face 46. In this case, a kinetic energy of the fuel injected by the injector 28 is canceled by a kinetic energy of the tumble flow T which opposes the injection direction of the fuel, and thus, the fuel does not penetrate the tumble flow T, and an area where the fuel is rich is formed within the lower section of the tumble flow T (hatched area in FIG. 8).

The rich area formed within the lower section of the tumble flow T by the fuel injection at the compression-stroke-latter-half injection timing shifts within the combustion chamber 16 along the tumble flow T. Then at the ignition timing, as illustrated in FIG. 9, the rich area is formed near the tip of the ignition plug 32. Thus, ignitability by the ignition plug 32 improves and, since the flame propagation speed increases, the knock resistance improves.

As described above, when the operating state of the engine 1 in the warmed-up state is within the first range of FIG. 4, the PCM 44 splits the fuel injection timing into the three timings which are the intake-stroke injection timing, the bottom-dead-center injection timing, and the compression-stroke-latter-half injection timing, and causes the injector 28 to inject the fuel so that the ratio of the fuel injection amounts at the respective injection timings becomes 5:4:1 (intake-stroke injection timing:bottom-dead-center injection timing:compression-stroke-latter-half injection timing).

Specifically, when the operating state of the engine 1 in the warmed-up state is within the first range where knocking easily occurs, by injecting the large portion of fuel at the intake-stroke injection timing and the bottom-dead-center injection timing, the vaporization of the fuel is stimulated to cool the mixture gas with the latent heat of the vaporization, by injecting the fuel at the bottom-dead-center injection timing, the tumble flow T is strengthened to maintain the turbulence of the mixture gas flow, and by injecting the fuel at the compression-stroke-latter-half injection timing to form the rich area near the ignition plug 32 at the ignition timing, the flame propagation speed is increased and, thus, the knock resistance is improved. Further, by injecting the fuel at the intake-stroke injection timing and the bottom-dead-center injection timing to uniformly distribute the fuel within the combustion chamber 16, emission performance is also improved.

When the operating state of the engine 1 in the warmed-up state is within the second range of FIG. 4, the PCM 44 splits the fuel injection timing into the two timings of the intake-stroke injection timing and the compression-stroke-latter-half injection timing, and causes the injector 28 to inject the fuel so that the ratio of the fuel injection amounts at the respective injection timings becomes 9:1 (intake-stroke injection timing:compression-stroke-latter-half injection timing).

Specifically, when the operating state of the engine 1 in the warmed-up state is within the second range where knocking occurs less easily compared to the first range but more easily compared to the third range, or when the engine 1 is in the cold state, by injecting the large portion of fuel at the intake-stroke injection timing, the vaporization of the fuel is stimulated to cool the mixture gas with the latent heat of the vaporization, and by injecting the fuel at the compression-stroke-latter-half injection timing to form the rich area near the ignition plug 32 at the ignition timing, the flame propagation speed is increased, and thus, the knock resistance is improved. Further, by injecting the large portion of fuel at the intake-stroke injection timing, the fuel is uniformly distributed within the combustion chamber 16 and the emission performance is improved.

When the operating state of the engine 1 in the warmed-up state is within the third range of FIG. 4 or when the engine 1 is in the cold state, the PCM 44 causes the injector 28 to inject the entirety of the fuel in a single injection at the intake-stroke injection timing.

When the operating state of the engine 1 in the warmed-up state is within the third range or the engine 1 is in the cold state, where knocking does not easily occur, by injecting the entirety of the fuel in a single injection at the intake-stroke injection timing to stimulate the vaporization of the fuel and uniformly distribute the fuel within the combustion chamber 16, the emission performance is improved.

Next, modifications of this embodiment are described.

In the embodiment described above, the two independent intake ports 18 and the two independent exhaust ports 20 are formed in the cylinder head 6 for each of the cylinders 2; however, the numbers of the intake and exhaust ports 18 and 20 may be different, respectively.

In the embodiment described above, the PCM 44 determines the operating state of the engine 1 based on the detection signals received from the fluid temperature sensor, the crank angle sensor, the accelerator position sensor, etc.; however, the operating state of the engine 1 may be determined by using detection signal(s) received from other sensor(s) (e.g., a detection signal received from a catalyst temperature sensor for detecting a temperature of a catalyst for purifying the exhaust gas).

In the embodiment described above, the total fuel injection amount in one cycle is designed so that the mixture gas becomes lean as a whole, which is thinner than the theoretical air-fuel ratio; however, it may be designed so that the ratio of the mixture gas becomes substantially the same as the theoretical air-fuel ratio as a whole.

In the embodiment described above, when the operating state of the engine 1 is within one of the first and second ranges of FIG. 4, the PCM 44 causes the injector 28 to inject 10% of the total fuel injection amount at the compression-stroke-latter-half injection timing; however, the PCM 44 may cause the injector 28 to inject 10% to 20% of the total fuel injection amount at the compression-stroke-latter-half injection timing. Thus, the mixture gas near the tip of the ignition plug 32 at the ignition timing can suitably be enriched and the flame propagation speed can securely be increased, and, further, the mixture gas within an area far from the ignition plug 32 (i.e., end gas) can be prevented from becoming excessively lean, and unstable combustion can be prevented from occurring.

Next, operations and effects of the fuel control system of the engine 1 of the embodiment and the modifications thereof described above are described.

First, the PCM 44 causes the injector 28 to inject the fuel at the intake-stroke injection timing and, at the compression-stroke-latter-half injection timing, inject a smaller amount of fuel than the fuel injection amount at the intake-stroke injection timing in the direction opposing the positive direction of the tumble flow T within the combustion chamber 16. Therefore, in the fuel injection at the compression-stroke-latter-half injection timing, by canceling the kinetic energy of the fuel injected by the injector 28 with the kinetic energy of the tumble flow T which opposes the injection direction of the fuel, the rich area can be formed within the tumble flow T without the fuel penetrating the tumble flow T. Further, by shifting the rich area along the tumble flow T to be located near the tip of the ignition plug 32 at the ignition timing, the ignitability by the ignition plug 32 can be improved, and since the flame propagation speed increases, the knock resistance can be improved. Moreover, by injecting the large portion of fuel at the intake-stroke injection timing, the vaporization of the fuel is stimulated to cool the mixture gas with the latent heat of the vaporization, and the knock resistance can further be improved. Therefore, also within the operating range where abnormal combustion such as knocking easily occurs, knocking can securely be suppressed, and accordingly, the ignition timing can be advanced to increase the torque. Furthermore, by injecting the large portion of fuel at the intake-stroke injection timing, the fuel can be uniformly distributed within the combustion chamber 16 to achieve homogeneous combustion, and thus, the emission performance can also be improved.

Especially since the PCM 44 causes the injector 28 to inject the fuel at the compression-stroke-latter-half injection timing designed to be between 50 and 90 [deg BTDC], the fuel can securely be injected at the timing at which the injection direction of the fuel opposes the tumble flow T, and thus, the fuel rich area can be formed within the tumble flow T, and the rich area can be shifted along the tumble flow T to securely be located near the tip of the ignition plug 32 at the ignition timing, and the flame propagation speed can securely be increased.

Further, since the PCM 44 causes the injector 28 to inject 10% to 20% of the total fuel injection amount at the compression-stroke-latter-half injection timing, when the rich area formed within the tumble flow T is shifted to near the tip of the ignition plug 32 at the ignition timing, the mixture gas near the tip of the ignition plug 32 can suitably be enriched and the flame propagation speed can securely be increased, and further, the mixture gas within the area far from the ignition plug 32 can be prevented from becoming excessively lean, and unstable combustion can be prevented from occurring.

Further since the PCM 44 causes the injector 28 to inject the fuel at the compression-stroke-latter-half injection timing designed to be in the period in which the injection direction of the fuel by the injector 28 substantially opposes the direction in which the anti-injector-side inclined surface 50 of the crown face 46 extends obliquely upward and toward the injector 28, the fuel can be injected in the direction opposing the positive direction of the lower section of the tumble flow T which is obliquely upward and toward the injector 28 along the anti-injector-side inclined surface 50 of the crown face 46. Thus, the fuel rich area can be formed within the tumble flow T, the rich area can be shifted along the tumble flow T to securely be located near the tip of the ignition plug 32 at the ignition timing, and the flame propagation speed can securely be increased.

Especially since the injection direction of the fuel by the injector 28 is parallel to the direction in which the anti-injector-side inclined surface 50 of the crown face 46 extends obliquely upward and toward the injector 28, the injection direction of the fuel can securely oppose the positive direction of the tumble flow T which is obliquely upward and toward the injector 28 along the anti-injector-side inclined surface 50 of the crown face 46. Thus, the fuel rich area can be formed within the tumble flow T, the rich area can be shifted along the tumble flow T to more securely be located near the tip of the ignition plug 32 at the ignition timing, and the flame propagation speed can securely be increased.

Moreover, when the operating state of the engine 1 in the warmed-up state is within one of the first and second ranges, the PCM 44 causes the injector 28 to inject the fuel at the compression-stroke-latter-half injection timing, and when the operating state of the engine 1 in the warmed-up state is outside the first and second ranges (i.e., within the third range) or the engine 1 is in the cold state, the PCM 44 does not cause the injector 28 to inject the fuel at the compression-stroke-latter-half injection timing. Therefore, when the operating state of the engine 1 in the warmed-up state is within one of the first and second ranges where knocking easily occurs, the fuel is injected at the compression-stroke-latter-half injection timing to form the rich area near the ignition plug 32 at the ignition timing, so as to increase the flame propagation speed and improve the knock resistance. On the other hand, when the operating state of the engine 1 is one of within the third range and in the cold state, where knocking does not easily occur, by injecting the entirety of the fuel in a single injection at the intake-stroke injection timing to stimulate the vaporization of the fuel and uniformly distribute the fuel within the combustion chamber 16, the emission performance can be improved.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof, are therefore intended to be embraced by the claims.

LIST OF REFERENCE CHARACTERS

1 Engine
2 Cylinder
14 Piston
16 Combustion Chamber

18 Intake Port
20 Exhaust Port
26 Ceiling
28 Injector
30 Nozzle Hole
32 Ignition Plug
44 PCM
46 Crown Face
50 Anti-injector-side Inclined Surface
T Tumble Flow

The invention claimed is:

1. A fuel control system of an engine, the fuel control system controlling, by using a tumble flow, a behavior of fuel directly injected into a combustion chamber formed inside a cylinder of the engine, the fuel control system comprising:
a fuel injector for directly injecting the fuel into the combustion chamber;
an intake port of the engine configured to generate the tumble flow within the combustion chamber; and
a processor operatively coupled to the fuel injector and configured to cause the fuel injector to inject the fuel at a first injection timing and then inject a smaller amount of fuel than an amount injected at the first injection timing, in a direction opposing a positive direction of the tumble flow, at a second injection timing, the first injection timing designed to be in an intake stroke of the cylinder, the second injection timing designed to be in a latter half of a compression stroke of the cylinder,
wherein the fuel injector is disposed at a position of a circumferential edge portion of a ceiling of the combustion chamber on a side where the intake port is provided, and injects the fuel obliquely downward and toward an opposite side from the intake port,
wherein the engine has a piston having a crown face, and the crown face is formed with an inclined surface extending along an extending direction obliquely upward and toward a side where the fuel injector is provided, from an end portion of the crown face on an opposite side from the fuel injector, and
wherein the second injection timing is set at a timing when an axial line of a lower end portion of a fuel spray injected by the fuel injector intersects with the extending direction within the combustion chamber, the extending direction extending along the inclined surface of the crown face, thereby injecting the fuel spray injected by the fuel injector in the second timing in a direction opposing a positive direction of a lower section of the tumble flow which flows obliquely upward toward the fuel injector along the inclined surface of the crown face.

2. The fuel control system of claim 1, wherein the second injection timing is designed to be between 50° and 90° before a top dead center of the compression stroke.

3. The fuel control system of claim 1, wherein the processor causes the fuel injector to inject 10% to 20% of a total fuel injection amount in one operation cycle of the cylinder at the second injection timing.

4. The fuel control system of claim 1, wherein
an ignition plug of the engine is provided in a center portion of the ceiling of the combustion chamber, and
wherein the second injection timing is designed to be a timing at which an injection direction of the fuel by the fuel injector opposes the extending direction of the inclined surface of the crown face.

5. The fuel control system of claim 4, wherein the injection direction of the fuel by the fuel injector is parallel to the extending direction of the inclined surface of the crown face.

6. The fuel control system of claim 1, wherein the processor causes the fuel injector to inject the fuel at the second injection timing when an operating state of the engine in a warmed-up state is within an operating range of the engine where an engine load is relatively high and an engine speed is relatively low, and the processor does not cause the fuel injector to inject the fuel at the second injection timing when the operating state of the engine in the warmed-up state is outside the operating range where the engine load is relatively high and the engine speed is relatively low or when the engine is in a cold state.

7. A fuel control system of an engine, the fuel control system controlling, by using a tumble flow, a behavior of fuel directly injected into a combustion chamber formed inside a cylinder of the engine, the fuel control system comprising:
a fuel injector for directly injecting the fuel into the combustion chamber;
an ignition plug provided in a center portion of a ceiling of the combustion chamber;
a piston having a crown face formed with an inclined surface extending along an extending direction pointing obliquely upward from an end portion of the crown face on an opposite side from the fuel injector and extending toward a side where the fuel injector is provided;
a cavity formed at a center of the crown face of the piston;
an intake port of the engine configured to generate the tumble flow within the combustion chamber; and
a processor configured to cause the fuel injector to inject the fuel at a first injection timing and then inject a smaller amount of fuel than an amount injected at the first injection timing, in a direction opposing a positive direction of the tumble flow, at a second injection timing, the first injection timing designed to be in an intake stroke of the cylinder, the second injection timing designed to be in a latter half of a compression stroke of the cylinder,
wherein a length of the inclined surface of the crown face from the end portion of the crown face to the center of the crown face is longer than a diameter of the cavity.

8. A fuel control system of an engine, the fuel control system controlling, by using a tumble flow, a behavior of fuel directly injected into a combustion chamber formed inside a cylinder of the engine, the fuel control system comprising:
a fuel injector for directly injecting the fuel into the combustion chamber;
an intake port of the engine configured to generate the tumble flow within the combustion chamber; and
a processor configured to cause the fuel injector to inject the fuel at a first injection timing and then inject a smaller amount of fuel than an amount injected at the first injection timing, in a direction opposing a positive direction of the tumble flow, at a second injection timing, the first injection timing designed to be in an intake stroke of the cylinder, the second injection timing designed to be in a latter half of a compression stroke of the cylinder,
wherein the second injection timing is set at a timing when the tumble flow mixes the injected fuel to form rich mixture gas near a tip of an ignition plug.

9. The fuel control system of claim 1, wherein the second injection timing is set at a timing when the tumble flow mixes the injected fuel to form rich mixture gas near a tip of an ignition plug.

10. The fuel control system of claim 1, wherein when the processor is configured to detect an operating range of the engine where an engine load is above a predetermined load threshold and an engine speed is below a predetermined speed threshold, the processor sets the first injection timing to be around 270° before a top dead center of the compression stroke, sets the second injection timing to be between 50° and 90° before the top dead center of the compression stroke, and further injects the fuel at a third injection timing at around 180° before the top dead center of the compression stroke.

11. The fuel control system of claim 10, wherein a fuel injection amount injected at the first injection timing is configured to be greater than a fuel injection amount injected at the third injection timing, and wherein the fuel injection amount injected at the third injection timing is configured to be greater than a fuel injection amount injected at the second injection timing.

* * * * *